United States Patent
Miyatani

(10) Patent No.: US 8,351,547 B2
(45) Date of Patent: Jan. 8, 2013

(54) WIRELESS COMMUNICATION DEVICE, WIRELESS COMMUNICATION SYSTEM, AND METHOD FOR DETECTING RECEIVE TIMING OF DIRECT WAVE

(75) Inventor: Tetsuhiko Miyatani, Yokohama (JP)

(73) Assignee: Samsung Electromnics Co., Ltd., Suwon-si (KR)

( * ) Notice: Subject to any disclaimer, the term of this patent is extended or adjusted under 35 U.S.C. 154(b) by 272 days.

(21) Appl. No.: 12/798,301

(22) Filed: Mar. 31, 2010

(65) Prior Publication Data

US 2010/0246637 A1 Sep. 30, 2010

(30) Foreign Application Priority Data

Mar. 31, 2009 (JP) ................. 2009-085194

(51) Int. Cl.
*H03K 9/00* (2006.01)
(52) U.S. Cl. ........................ 375/316; 375/260
(58) Field of Classification Search .......... 375/144, 375/214, 232, 260, 296, 316, 350; 370/203, 370/208, 210
See application file for complete search history.

(56) References Cited

U.S. PATENT DOCUMENTS

| | | | | |
|---|---|---|---|---|
| 6,693,984 B1 * | 2/2004 | Andre | ........................ | 375/350 |
| 6,711,123 B1 * | 3/2004 | Taira | ........................ | 370/208 |
| 7,561,048 B2 * | 7/2009 | Yushkov et al. | ........... | 340/572.1 |
| 7,634,023 B2 * | 12/2009 | Thesling | ........................ | 375/296 |
| 7,693,035 B2 * | 4/2010 | Hasegawa et al. | ........... | 370/208 |
| 7,751,488 B2 * | 7/2010 | Moffatt | ........................ | 375/260 |
| 7,826,541 B2 * | 11/2010 | Fujii et al. | ........................ | 375/260 |
| 8,111,743 B2 * | 2/2012 | Imamura | ........................ | 375/232 |
| 2002/0039383 A1 * | 4/2002 | Zhu et al. | ........................ | 375/214 |
| 2002/0126741 A1 * | 9/2002 | Baum et al. | ........................ | 375/144 |
| 2005/0002323 A1 * | 1/2005 | Hadad | ........................ | 370/203 |
| 2006/0128323 A1 * | 6/2006 | Fujimoto | ........................ | 455/101 |
| 2007/0133393 A1 * | 6/2007 | Bocquet | ........................ | 370/210 |
| 2009/0103645 A1 * | 4/2009 | Jitsukawa et al. | ........... | 375/260 |
| 2009/0245406 A1 * | 10/2009 | Moffatt et al. | ........... | 375/261 |

* cited by examiner

Primary Examiner — David Ometz
Assistant Examiner — Fitwi Hailegiorgis

(57) ABSTRACT

A wireless communication device and method are capable of detecting a receive timing of a direct wave at higher precision without increasing transmit power. A signal receiver receives a signal having a center frequency changed in a predetermined rule at predetermined time intervals. A time-frequency transformer transforms the received signal from a time domain to a frequency domain. A filter removes frequency-domain signal components unused during reception, based on the predetermined rule, from the frequency-domain signal. A reverse modulator performs a reverse modulation process on the remaining signal components. A signal adder generates an added signal by performing accumulative addition on the signal components that underwent the reverse modulation process in the reverse modulator for a predetermined period. A direct wave arrival time determiner determines an arrival time of a direct wave according to an impulse response obtainable from an output of the frequency-time transformer.

20 Claims, 14 Drawing Sheets

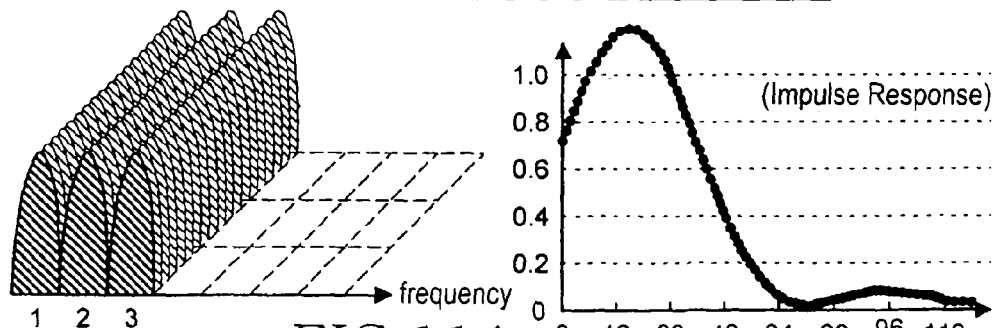
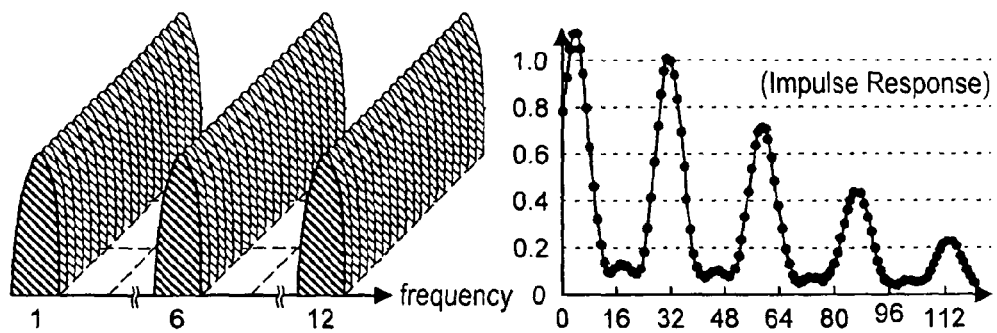
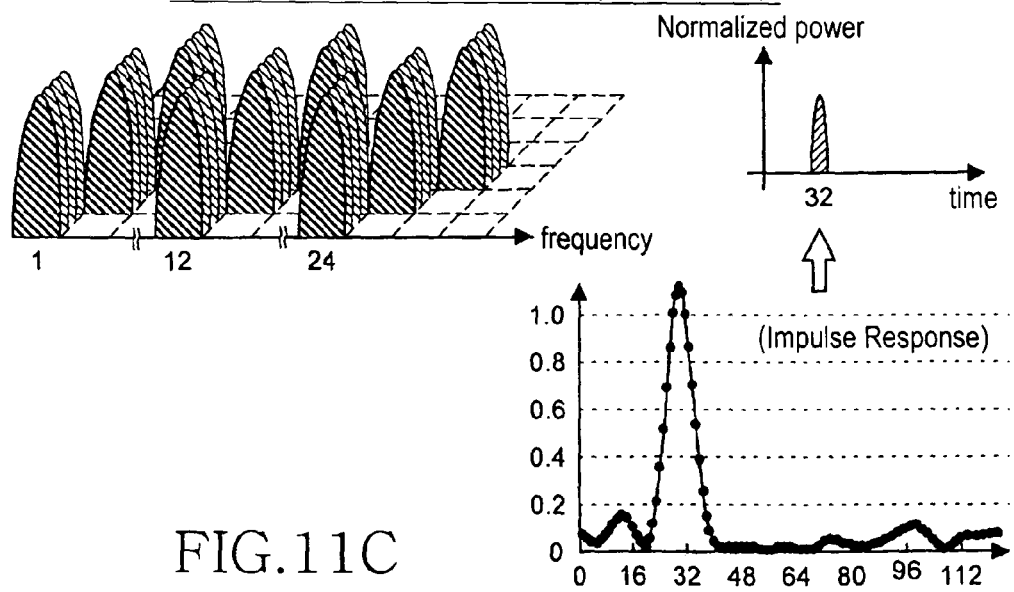
FIG. 11A
FIG. 11B
FIG. 11C

WIRELESS COMMUNICATION DEVICE, WIRELESS COMMUNICATION SYSTEM, AND METHOD FOR DETECTING RECEIVE TIMING OF DIRECT WAVE

CROSS-REFERENCE TO RELATED APPLICATION(S) AND CLAIM OF PRIORITY

The present application is related to and claims the benefit under 35 U.S.C. §119(a) of a Japanese Patent Application filed in the Japanese Patent Office on Mar. 31, 2009 and assigned Serial No. 2009-085194, the entire disclosure of which is hereby incorporated by reference.

TECHNICAL FIELD OF THE INVENTION

The present invention relates to a wireless communication device, a wireless communication system, and a method for detecting receive timings of direct waves.

BACKGROUND OF THE INVENTION

Recently, attention has been focused on a position detection technology for wireless terminals in the field of sensor networks or cellular communications. For example, in the field of sensor networks, a technology draws attention, which achieves position detection by placing sensors equipped with a wireless communication function in different places and analyzing reception results by these sensors. More specifically, a configuration has been proposed, in which the precision of position detection is increased by considering positions (coordinates), placement density, and radio coverage of the sensors. In the field of cellular communications, a technology is known, which requires Time Difference Of Arrival (TDOA) of radio waves received via multiple receive antennas, and detects the positions based on the TDOA. A system designed to receive radio waves via the multiple receive antennas may include, for example, a Distributed Antenna System (DAS) (see FIG. 2B).

Position detection used in these fields is performed, for example, in the manner shown in FIG. 3. FIG. 3 illustrates a position detection method on the assumption that one wireless terminal X exists in a system with four receiver antennas. In FIG. 3, each of the distances d1~d4 represents estimated distances calculated based on received radio waves that have arrived at the respective antenna from the wireless terminal X. Because multiple estimated distances can be obtained with use of multiple antennas, an intersection of areas having the estimated distances as their radii may be presumed as a position where the wireless terminal exists. Each estimated distance is calculated based on a receive timing of a received radio wave that has arrived at each antenna.

For example, when a relative delay time difference TDOA between certain antennas is 50 ns, a distance difference between the antennas is calculated as 15 m because light velocity c is approximately $3 \times 10^8$ m/s. When a reference time is determined using the Global Positioning System (GPS), it is also possible to measure a distance based on the time from the reference time until the first radio wave is received. Meanwhile, three-point positioning may be used when position detection is performed using the GPS in a downlink (a link from a base station to a wireless terminal). Even in this case, the first arrived radio wave is used. In order to perform such position detection, it is necessary to obtain a time difference using the first arrived radio wave.

Herein, reference will be made to Japanese Patent No. 3,596,442, which is hereby incorporated by reference.

However, an influence of reflected waves is added to the radio waves in a transmission path. Thus, in order to increase precision of position detection, it is necessary to precisely detect arrival timings of direct waves from received radio waves to which the influence of reflected waves was added in the transmission path. In addition, measurement precision of position detection in the current cellular mobile communication (without GPS function) is 300 m at most. One of the main reasons is that because an occupied bandwidth of cellular terminals is about 1 MHz, time resolution is insufficient, and it is difficult to distinguish direct waves from delayed waves. Besides, if the time resolution is increased in order to make it easy to distinguish direct waves from delayed waves, the wireless terminal needs to transmit broadband sensing signals. Thus, it is very difficult for the wireless terminal to achieve the intention using its limited power resource.

SUMMARY OF THE INVENTION

To address the above-discussed deficiencies of the prior art, it is a primary object to provide at least the advantages described below. Accordingly, an aspect of the present invention provides a wireless communication device, a wireless communication system, and a method for detecting receive timings of direct waves, which are new and improved to detect receive timings of direct waves at higher precision without increasing transmit power of wireless terminals.

In accordance with one aspect of the present invention, there is provided a wireless communication device that includes a signal receiver for receiving a signal having a center frequency that is changed in a predetermined rule at intervals of a predetermined time. A time-frequency transformer is also included for transforming an output of the signal receiver from a time domain to a frequency domain. An unused-domain component removing filter removes frequency-domain signal components, unused during reception based on the predetermined rule, from a frequency-domain signal transformed in the time-frequency transformer. A reverse modulator performs a reverse modulation process on the signal components that have passed through the unused-domain component removing filter. A signal adder generates an added signal by performing accumulative addition on the signal components that underwent the reverse modulation process in the reverse modulator for a predetermined period A frequency-time transformer transforms the added signal generated in the signal adder from the frequency domain to the time domain, and a direct wave arrival time determiner determines an arrival time of a direct wave according to an impulse response obtainable from an output of the frequency-time transformer.

By the above configuration, it is possible to realize equivalent broadband communication and obtain a delay profile that consists of a sharp autocorrelation peak. As a result, it is possible to distinguish a direct wave from delayed waves at higher precision, thus improving the precision for detecting a receive timing of a direct wave.

The wireless communication device may further include a Multi-Path Interference Canceller (MPIC) for canceling multipath interference components included in the impulse response. The cancellation of multipath interference components may reduce the effect of autocorrelation side lobes.

The wireless communication device may further include an in-phase addition/averaging unit for performing in-phasing on a pertinent impulse response based on a phase of a direct wave that is temporarily detected by removing multipath interference components from the impulse response, and averaging the impulse response for a predetermined time. By performing the in-phase addition/averaging, it is possible to suppress direct wave's level degradation due to frequency-selective fading, or to improve noise immunity.

In accordance with another aspect of the present invention, there is provided a wireless communication system, in which a wireless terminal has a frequency changer for changing a center frequency of a transmission signal in a predetermined rule at intervals of a predetermined time, and a signal transmitter for transmitting a signal at the center frequency changed by the frequency changer. The wireless communication system also includes a wireless communication device, which may include a signal receiver, a time-frequency transformer, an unused-domain component, a reverse modulator, a signal adder, a frequency-time transformer, and a direct wave arrival time determiner. The signal receiver receives a signal having a center frequency that is changed in a predetermined rule at intervals of a predetermined time. The time-frequency transformer for transforms an output of the signal receiver from a time domain to a frequency domain. The unused-domain component removing filter for removes frequency-domain signal components, unused during reception based on the predetermined rule, from a frequency-domain signal transformed in the time-frequency transformer. The reverse modulator performs a reverse modulation process on the signal components that have passed through the unused-domain component removing filter The signal adder generates an added signal by performing accumulative addition on the signal components that underwent the reverse modulation process in the reverse modulator for a predetermined period. The frequency-time transformer transforms the added signal generated in the signal adder from the frequency domain to the time domain. The direct wave arrival time determiner determines an arrival time of a direct wave based on an impulse response obtainable from an output of the frequency-time transformer.

By the above configuration, it is possible to realize equivalent broadband communication and to obtain a delay profile consisting of a sharp autocorrelation peak. As a result, it is possible to distinguish a direct wave from delayed waves at higher precision, thus improving precision of detecting a receive timing of a direct wave.

The wireless terminal may further include a plurality of transmit antennas for transmitting the signal, and an antenna switch for switching the transmit antennas that are used at intervals of a predetermined time. By such configurations, it is possible to suppress direct wave level degradation due to frequency-selective fading, and to obtain an effect of antenna selection diversity by multiple transmit antennas.

The wireless terminal may further include a plurality of transmit antennas, and the signal transmitter may be adapted to simultaneously transmit the same signal via the plurality of transmit antennas. By such configurations, it is possible to suppress direct wave level degradation due to frequency-selective fading, and to obtain an effect of antenna selection diversity.

The frequency changer may be adapted to change a plurality of center frequencies distributed on a frequency axis at regular intervals, in the predetermined rule while maintaining a predetermined interval. The signal transmitter may be adapted to transmit the signal at the plurality of center frequencies changed in the frequency changer. By such configurations, it is possible to realize broader-band communication without widening a bandwidth of each signal spectrum.

In accordance with a further another aspect of the present invention, there is provided a method for detecting a timing of a direct wave. A signal, having a center frequency that is changed in a predetermined rule at intervals of a predetermined time, is received. The received signal is transformed from a time domain a frequency-component signal. Frequency-component signal components, unused during reception based on the predetermined rule, are removed from the frequency-component signal. A reverse modulation process is performed on signal components left in the unused-domain component removing step. An added signal is generated by performing accumulative addition on the signal components that underwent the reverse modulation process for a predetermined period. The added signal is transformed from the frequency domain to the time domain, and an arrival time of a direct wave is determined based on an impulse response, which may be obtained from the transformed added signal in the time domain.

By the above process, it is possible to realize equivalent broadband communication and to obtain a delay profile consisting of a sharp autocorrelation peak. As a result, it is possible to distinguish a direct wave from delayed waves at higher precision, thus improving precision of detecting a receive timing of a direct wave.

In accordance with yet another aspect of the present invention, there is provided a method for detecting a timing of a direct wave. A center frequency of a transmission signal is changed in a predetermined rule at intervals of a predetermined time. The signal is transmitted at the changed center frequency. The transmitted signal is received at a wireless communication device. The received signal is transformed from a time domain to a frequency domain. Frequency-domain signal components, unused during reception based on the predetermined rule, are removed from the frequency-domain signal. A reverse modulation process is performed on signal components remaining after the unused-domain component are removed. An added signal is generated by performing accumulative addition on the signal components that underwent the reverse modulation process for a predetermined period. The added signal is transformed from the frequency domain to the time domain. An arrival time of a direct wave is determined based on an impulse response that may be obtained from the added signal in the time domain.

By the above process, it is possible to realize equivalent broadband communication and to obtain a delay profile consisting of a sharp autocorrelation peak. As a result, it is possible to distinguish a direct wave from delayed waves at higher precision, thus improving precision of detecting a receive timing of a direct wave.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11A to 11C illustrate the effects obtainable by the embodiment of the present invention;

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Flow of Description

Figure 2B:
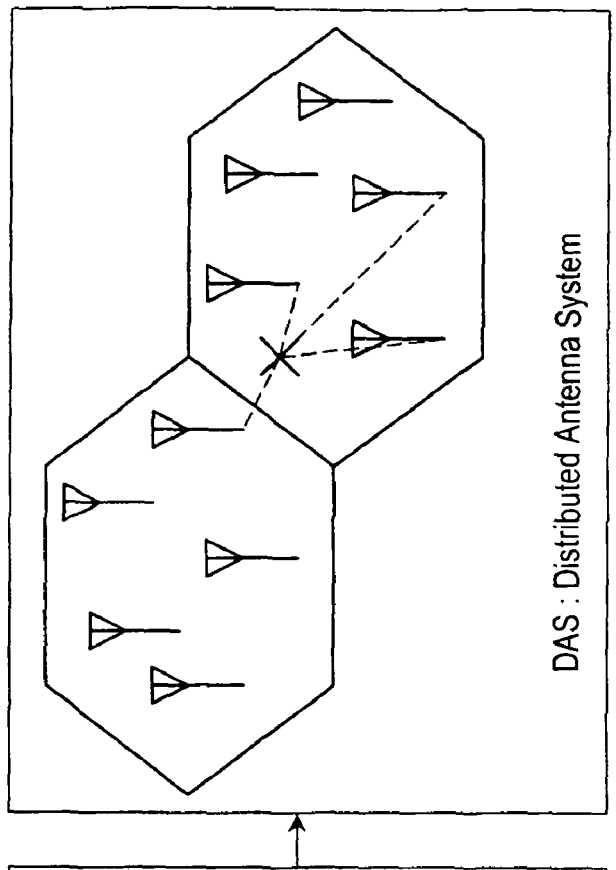
FIGS. 2A and 2B illustrate a cellular system and a Distributed Antenna System (DAS)
Figure 2A:
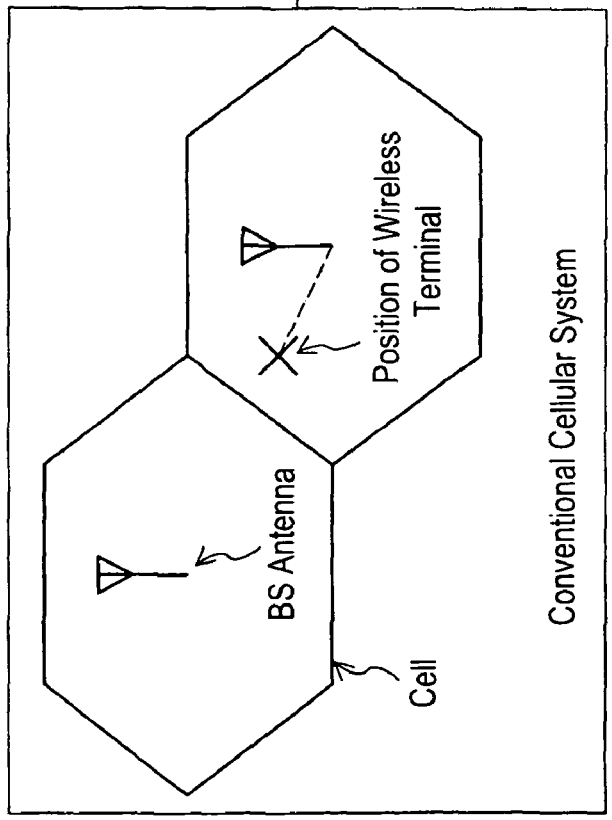
Figure 3:
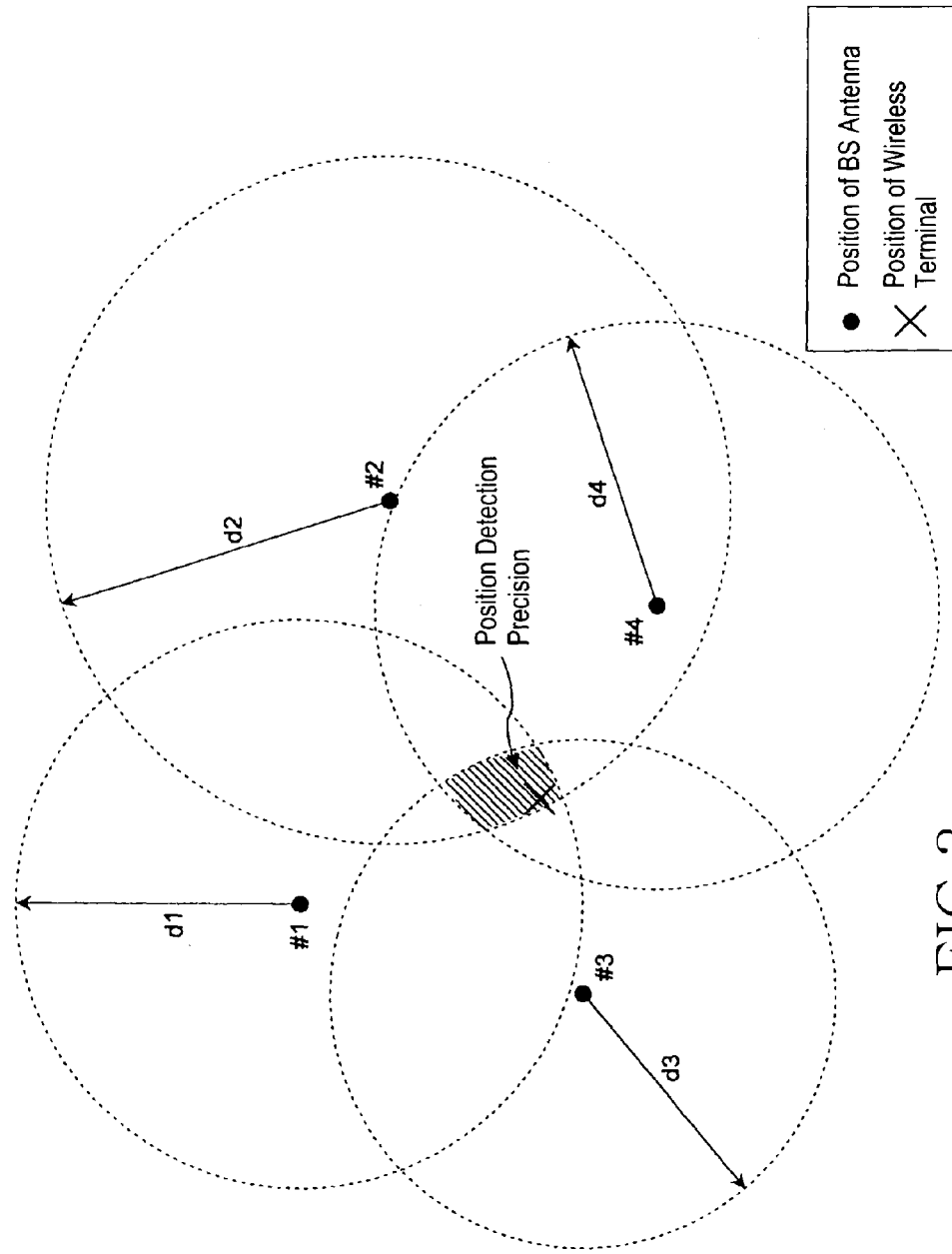
FIG. 3 illustrates an example of a position detection method in a DAS.

A flow of a description of exemplary embodiments of the present invention stated below will now be described in brief. First, an exemplary configuration of a wireless terminal 100 and a base station 200 according to an embodiment of the present invention will be described with reference to FIG. 1. Also, a relationship between communication bands and shapes of delay profiles (time resolutions) will be described with reference to FIGS. 4A to 5B. In addition, FIGS. 2 and 3 illustrate a DAS and a position detection technique provided to apply the technology associated with an embodiment of the present invention.

Next, a first modification of the embodiment will be described with reference to FIG. 6. Also, a second modification of the embodiment will be described with reference to FIG. 7. A relationship between arrangements of chunks and shapes of delay profiles will be described with reference to FIGS. 11A to 11C. In addition, a third modification of the embodiment will be described with reference to FIG. 8. The first to third modifications are related to the configuration of the base station 200.

Figure 9:
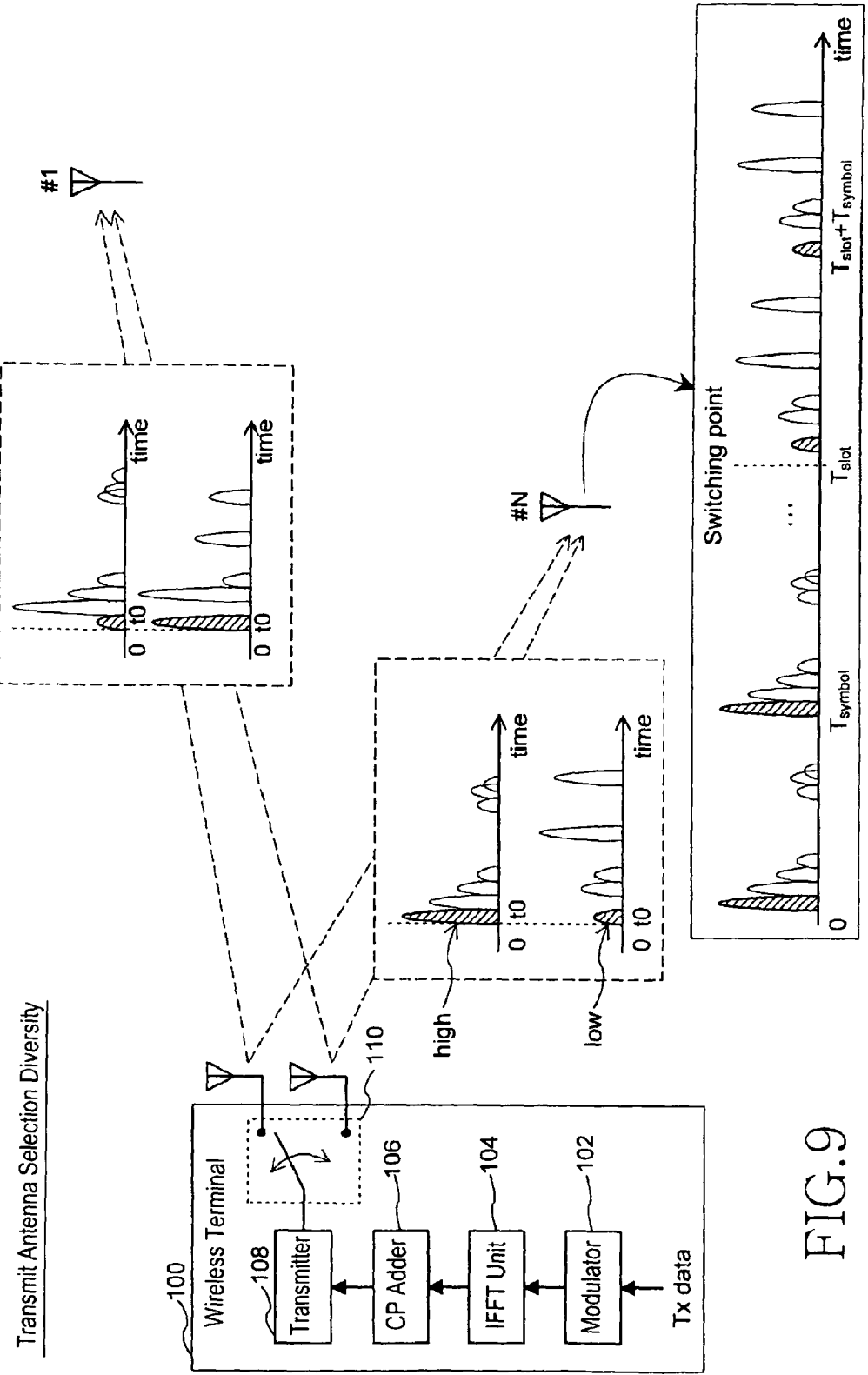
FIG. 9 illustrates a configuration of a wireless terminal according to a fourth modification of the embodiment.

Subsequently, a fourth modification of the embodiment will be described with reference to FIG. 9. Also, a fifth modification of the embodiment will be described with reference to FIG. 10. The fourth and fifth modifications are related to the configuration of the wireless terminal 100. Finally, the effects obtainable by applying the technology associated with the present invention will be described with reference to FIGS. 12 to 14.

Embodiment

An embodiment of the present invention will be described. The embodiment proposes a timing detection method, in which a transmitting side implements frequency hopping when transmitting carrier signals, and a receiving side adds carrier signals of different frequencies and detects timings of direct waves from the added signals based on required delay profiles. This timing detection method is implemented by the wireless communication system that is described in detail below.

Configuration of Wireless Communication System

Figure 1:
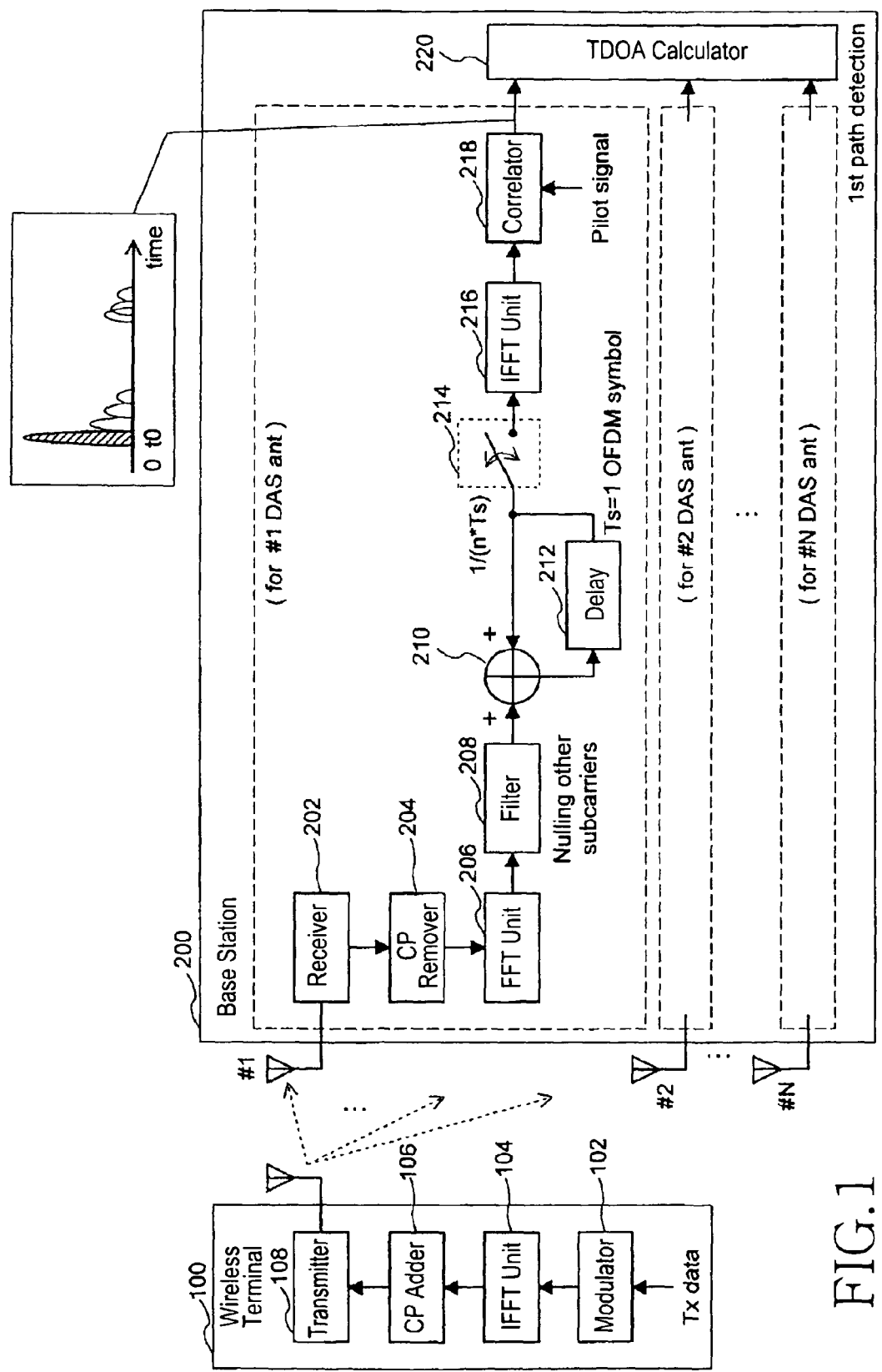
FIG. 1 illustrates a configuration of a wireless terminal and a base station according to an embodiment of the present invention.

A wireless communication system associated with the embodiment includes the wireless terminal 100 and the base station 200, as shown in FIG. 1. Although only one wireless terminal 100 is shown in the example of FIG. 1, multiple wireless terminals 100 may be included in the wireless communication system. It is also assumed that N antennas are installed in the base station 200.

Wireless Terminal 100

The wireless terminal 100 mainly includes a modulator 102, an Inverse Fast Fourier Transform (IFFT) unit 104, a cyclic prefix (CP) adder 106, and a transmitter 108.

Transmission data and a pilot signal used during decoding are modulated by the modulator 102 using a specific modulation scheme. The modulator 102 implements frequency hopping so that the center frequency of a signal spectrum is changed at intervals of a predetermined time. That is, the center frequency of a signal spectrum is switched in a predetermined rule at intervals of a predetermined time. The specific modulation scheme may include, for example, Binary Phase Shift Keying (BPSK), Quadrature Phase Shift Keying (QPSK) and 16-ary Quadrature Amplitude Modulation (16QAM). A modulation signal that is mapped to each sub-carrier and output from the modulator 102 is input to the IFFT unit 104. In this specification, it is assumed for convenience that multiprocessing is performed by Orthogonal Frequency Division Multiplexing (OFDM).

The IFFT unit 104 obtains an OFDM signal by performing an IFFT process on the input modulation signal. The OFDM signal that is IFFT-transformed in the IFFT unit 104 is input to the CP adder 106. In the CP adder 106, a guard interval is added to the IFFT-processed OFDM signal. The guard interval is added to cancel interference between OFDM blocks, caused by multiple paths. The OFDM signal output from the CP adder 106 is input to the transmitter 108 and up-converted up to a predetermined radio frequency band. The up-converted OFDM signal is transmitted to the base station 200 via an antenna.

Base Station 200

The base station 200 mainly includes a receiver 202, a CP remover 204, an Fast Fourier Transform (FFT) unit 206, a filter 208, an adder 210, a delay component 212, a switch 214, an IFFT unit 216, a correlator 218, and a TDOA calculator 220. All the components other than the TDOA calculator 220 are installed for each antenna independently. In this disclosure, processing a signal received from only an antenna #1 will be described, for convenience. Signals received at other antennas #2~#N are also processed in the same way. When there are multiple wireless terminals 100, the number of sets of the above components installed in the base station 200 is equal to the number of the wireless terminals 100.

As stated above, an OFDM signal is transmitted to the base station 200 from the wireless terminal 100. Regarding a signal spectrum of the OFDM signal transmitted from the wireless terminal 100, its center frequency is changed at intervals of a predetermined time. A signal received via the antenna #1 is input to the receiver 202 and down-converted from a radio frequency band to a base band. The received signal down-converted in the receiver 202 is input to a CP remover 204, in which a guard interval is removed from the received signal. The received signal from which the guard interval was removed in the CP remover 204 is input to the FFT unit 206.

In the FFT unit 206, an FFT process is performed on the received signal input from the CP remover 204. The received signal FFT-processed in the FFT unit 206 is input to the filter 208. The filter 208 is a filter means for removing, from the received signal, frequency components in a frequency band that the wireless terminal 100 does not use at the transmission time of the input received signal. Regarding the received signal that was input from the FFT unit 206 to the filter 208, frequency components in the unused frequency band are removed by the filter 208, and the remaining frequency components are input to the adder 210. An accumulated added signal (described below) of the signals received up to the previous period is input to the adder 210.

The added signal output from the adder 210 is input to the delay component 212, in which the input added signal is delayed by a time delay time Ts. The delay time Ts, for which the guard interval is enough, may be set as one OFDM symbol, for example. The delayed signal output from the delay component 212 is fed back to the adder 210, if the switch 214 is in an open state. Hence, the continuously received signal is accumulated and added by the adder 210 and the delay component 212, generating an accumulated added signal. The output of the delay component 212 is input to the adder 210 for a period in which the switch 214 is in the open state.

The switch 214 maintains the open state for an observation time (described later) of a delay profile, and transitions to a closed state after a lapse of the observation time. In the closed state, the output of the delay component 212 is connected to an input of the IFFT unit 216. For example, if the observation time of the delay profile is set as n OFDM symbols, the switch 214 is opened/closed once every n*Ts in time. As stated above, in the wireless terminal 100, frequency hopping is carried out in a predetermined rule at stated intervals. Therefore, the observation time of the delay profile is set such that multiple OFDM signals transmitted at different center frequencies are accumulated and added while the switch 214 is in the open state.

As stated above, if the switch 214 transitions to the closed state, the accumulated added signal is input from the delay component 212 to the IFFT unit 216, in which the input accumulated added signal undergoes an IFFT process and is transformed into a time-domain signal. The accumulated added signal converted into the time-domain signal by the IFFT unit 216 is input to the correlator (complex correlator) 218.

In the correlator 218, an autocorrelation of the input accumulated added signal is calculated using a pilot signal assigned by the wireless terminal 100 or a signal of the transmission data (Reverse-Modulation Processing). Generally, the transmission data is unknown data that the receiving side cannot know. However, in the embodiment, since a series of signal processing associated with an autocorrelation operation is assumed as accumulated batch processing, there is no problem in that the transmission data is unknown in the receiving side. The term "accumulated batch processing" as used herein refers to a process of performing position detection on the accumulated received signal after decoding of the transmission data is terminated. When a known signal is transmitted as transmission data for position detection in transmission/reception, the above assumption is not required. As a result, it is possible to obtain a delay profile (see FIG. 1) based on the autocorrelation calculated by the correlator 218. The delay profile is a power representation of an impulse response. Therefore, the delay profile may be obtained by creating an impulse response and calculating (or powerizing) its strength. Thus, in the correlator 218, an impulse response is created by an autocorrelation operation and a delay profile is calculated from the impulse response. Meanwhile, while the impulse response is a complex expression, the delay profile is a scalar expression. Accordingly, it is preferable to use the delay profile in detecting receive timings of direct waves. Thus, according to the present disclosure, receive timings are detected from the delay profile.

Information about the delay profile obtained by the autocorrelation operation in the correlator 218 is input to the TDOA calculator 220. The TDOA calculator 220 detects receive timings of direct waves from the input delay profile information. As shown in FIG. 1, information regarding the delay profiles corresponding to the signals received at the respective antennas is input to the TDOA calculator 220. The TDOA calculator 220 detects receive timings of direct waves corresponding to the respective antennas and calculates TDOA among the antennas. By doing so, it is possible to implement the position detection shown in FIG. 3 based on the TDOA.

As described above, a configuration of the wireless communication system associated with the embodiment is characterized by a configuration in which the transmitting side hops the center frequency to a frequency determined in a predetermined rule at intervals of a predetermined time, and the receiving side accumulates the received signals until the frequency hopping based on the predetermined rule is terminated and processes the received signals in bulk. By employing this configuration, it is possible to improve time resolution of the delay profile and to distinguish direct waves from reflected waves at higher precision. Consequently, it is possible to calculate TDOA at higher precision, drastically improving position detection accuracy. The reason for achieving such effects will be described in more detail below.

Relationship Between Communication Band and Time Resolution

Figure 4A:
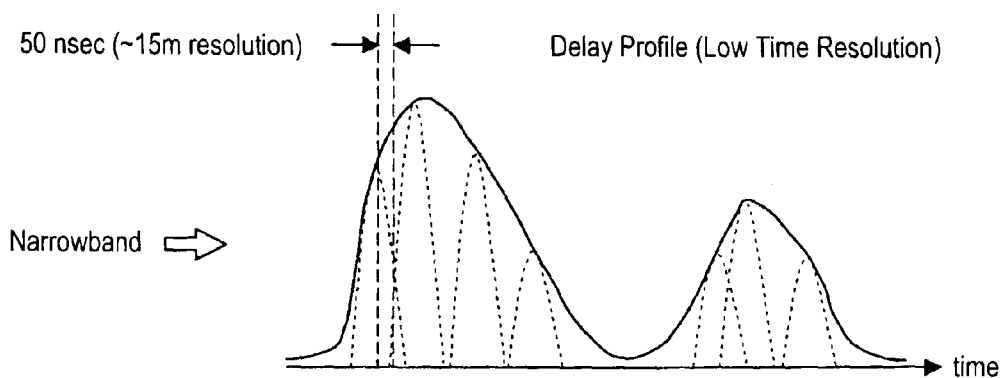
FIGS. 4A and 4B illustrate an impulse response obtainable in narrowband transmission and an impulse response obtainable in broadband transmission.
Figure 4B:
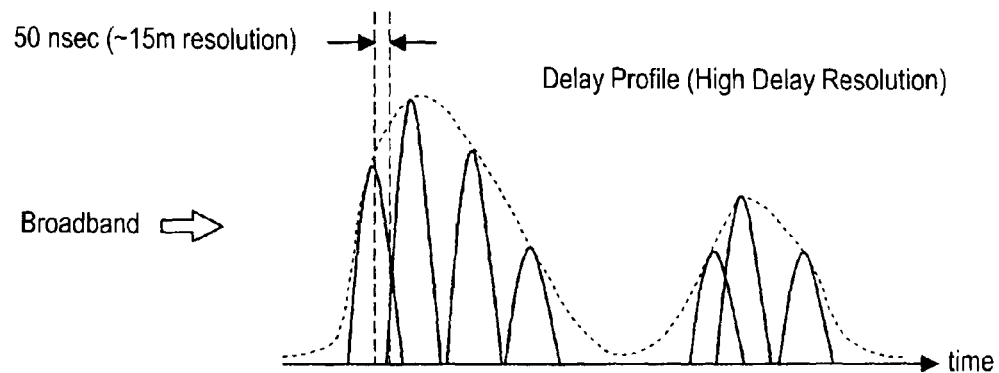

FIG. 4A shows a waveform of a delay profile (solid line) obtainable from a received signal in signal transmission based on narrowband communication, and FIG. 4B shows a waveform of a delay profile (solid line) obtainable from a received signal in signal transmission based on broadband communication. Herein, single carrier transmission is considered for simplicity. In the case of the narrowband communication of FIG. 4A, due to the narrow bandwidth of the transmission signal, the delay profile has a blunt shape, making it difficult to clearly distinguish positions of preceding waves as shown in FIG. 4A.

In the case of the broadband communication of FIG. 4B, due to the broad bandwidth of the transmission signal, the delay profile has a sharp shape, improving equivalent time resolution. As a result, it is possible to clearly distinguish preceding waves from delayed waves as shown in FIG. 4B. For these reasons, narrowband communication has low time resolution, while broadband communication has high time resolution. However, the broadband communication-based transmission requires large transmit power. Therefore, it is difficult to implement the broadband communication in the wireless terminal 100 having small available transmit power.

Accordingly, there is a need for a method of obtaining the effects of the broadband communication while inhibiting the transmit power. In retrospect of the configuration of the embodiment, although the wireless terminal 100 associated with the embodiment performs frequency hopping, the bandwidth used for signal transmission is not increased. Meanwhile, in the base station 200 associated with the embodiment, received signals for signals transmitted in other frequency bands are accumulated and added, generating an accumulated added signal having a broad bandwidth. As a result, a delay profile having sharp peaks is calculated by computing an autocorrelation using the accumulated added signal. These shapes are schematically shown in FIGS. 5A and 5B.

Figures 5A, 5B:
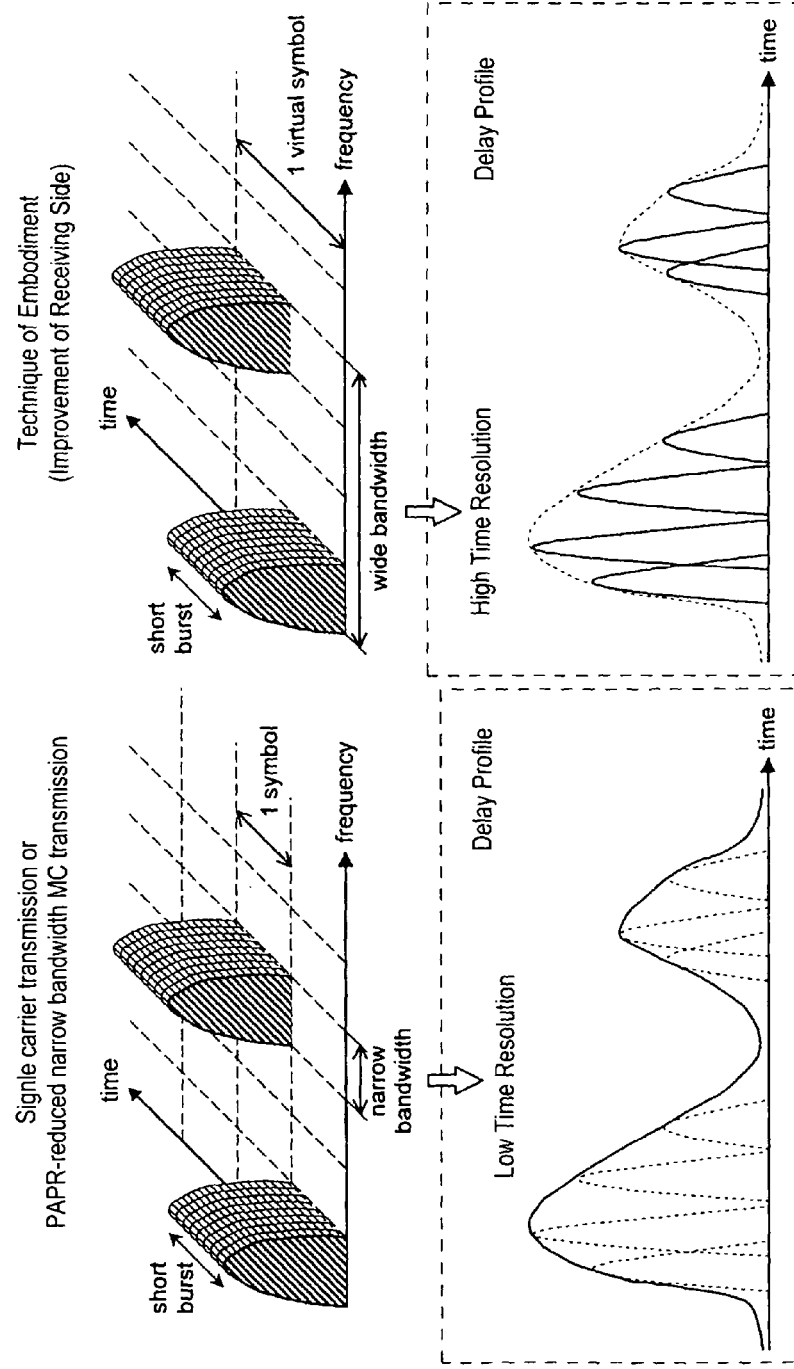
FIGS. 5A and 5B illustrate impulse responses obtainable in the conventional frequency hopping-based transmission and the transmission based on an embodiment of the present invention.

In FIG. 5A, a delay profile detected in a receiving side in case of narrowband communication-based transmission using only frequency hopping is schematically shown for comparison purposes. In FIG. 5B, a delay profile detected in a receiving side by the embodiment is schematically shown. A difference between FIGS. 5A and 5B lies in the symbol interval based on which the delay profile is calculated. In FIG. 5A, although signals transmitted at different times are allocated to different frequency bands, an autocorrelation is calculated for a symbol interval (1 symbol) of each signal, thereby blunting the shape of the delay profile.

In FIG. 5B, signals transmitted at different times are allocated to different frequency bands as in FIG. 5A and one virtual symbol interval is given by rearranging two symbol intervals. This process corresponds to generating an accumulated added signal by the adder 210, the delay component 212 and the switch 214 in the base station 200 shown in FIG. 1.

As shown in FIG. 5B, because signals transmitted in different frequency bands are included in one virtual symbol interval, broadband communication may be implemented virtually. By calculating an autocorrelation regarding this virtual symbol interval, a delay profile with sharp correlation peaks may be obtained. For this reason, by applying the technology associated to the embodiment, it is possible to easily distinguish preceding waves from delayed waves, and detect receive timings of the preceding waves at high precision.

First Modification: Modification Regarding Autocorrelation Operation

Thus far, autocorrelation calculation on the time axis has been considered to obtain a delay profile. However, from the principles of Fourier transform, the autocorrelation calculation on the time axis may be implemented using multiplication on the frequency axis. For example, calculation of an autocorrelation may be achieved by multiplication (a multiplier 222) on the frequency axis in a configuration of the base station 200, shown in FIG. 6, without calculating the autocorrelation in a correlator installed at the back of the IFFT unit 216 (in contrast to the base station 200 shown in FIG. 1). This operation may be regarded as reverse-modulation processing on the frequency axis. In actual design, because the circuit size can be reduced advantageously, it is preferable to provide a configuration of calculating an autocorrelation in multiplication on the frequency axis as shown in FIG. 6.

A configuration of the base station 200 associated with the first modification of the embodiment will now be described with reference to FIG. 6. In the first modification, the configuration of the wireless terminal 100 is not modified. As shown in FIG. 6, the base station 200 essentially includes the receiver 202, the CP remover 204, the FFT unit 206, the filter 208, the adder 210, the delay component 212, the switch 214, the IFFT unit 216, the TDOA calculator 220, and the multiplier 222. The main difference with the base station 200 shown in FIG. 1 is in that the correlator 218 is omitted and the multiplier 222 is added.

Figure 6:
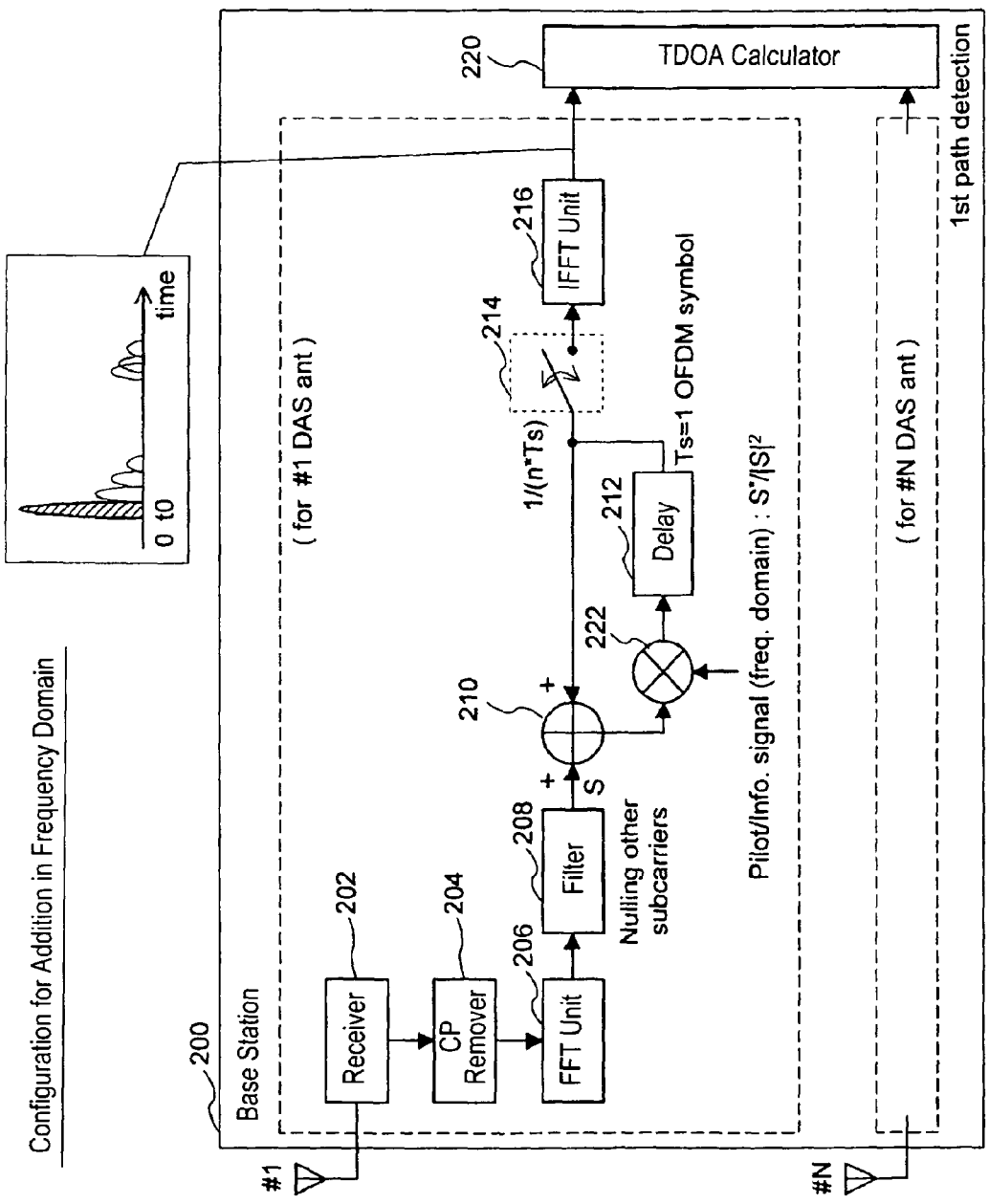
FIG. 6 illustrates a configuration of a base station according to a first modification of the embodiment.

With reference to the base station 200 in FIG. 6, an OFDM signal is transmitted to the base station 200 from the wireless terminal 100. As to a signal spectrum of the OFDM signal transmitted from the wireless terminal 100, its center frequency is changed at intervals of a predetermined time. The signal received via an antenna #1 is input to the receiver 202 and down-converted from the radio frequency band to the base band. The down-converted received signal is input to the CP remover 204, in which a guard interval is removed from the received signal. The received signal, from which the guard interval is removed in the CP remover 204, is input to the FFT unit 206.

In the FFT unit 206, an FFT process is performed on the received signal input from the CP remover 204 to transform the received signal from the time domain to the frequency domain. The received signal FFT-processed in the FFT unit 206 is input to the filter 208. The received signal input to the filter 208 from the FFT unit 206 is input to the adder 210, after frequency components in the unused frequency bands are removed by the filter 208. A signal output from the delay component 212 is fed back to the adder 210 while the switch 214 is in an open state.

The added signal output from the adder 210 is input to the multiplier 222. A pilot signal assigned in the wireless terminal 100 or a multiplication coefficient corresponding to a reciprocal of the transmission data signal is input to the multiplier 222. For example, if a signal newly input from the filter 208 to the adder 210 is represented by S, $S^*/|S|^2$ is input to the multiplier 222 as a multiplication coefficient. That is, in the multiplier 222, a division process on a pilot signal used during transmission or a transmission data signal is performed subcarrier by subcarrier.

Herein, the subcarrier unit represents a unit of frequency elements, and means performing reciprocal calculation on the newly added frequency unit, rather than performing reciprocal multiplication on the signal accumulated until then. Therefore, the signal accumulated and added in the adder 210 undergoes smoothing in a division process during new addition. The term "smoothing" as used herein refers to a process of removing modulation performed on a signal of each frequency unit based on the transmission data. That is, reverse modulation for a signal of each frequency unit is implemented in the frequency domain.

If the pilot signal used during transmission or the component of the transmission data signal is removed from the frequency domain as above, a method other than division may be used. Preferably, a value used as the multiplication coefficient may be set by first determining a received signal and then feeding back the determination results. In this case, information about the received signal is stored in a storage device such as a memory.

The signal output from the multiplier 222 is input to the delay component 212, in which the input added signal is delayed by a delay time Ts. The delay time Ts, for which a guard interval is enough, is set as one OFDM symbol, for example. The delayed signal output from the delay component 212 is fed back to the adder 210 if the switch 214 is in an open state. Therefore, the continuously received signal is accumulated and added by the adder 210 and the delay component 212, generating an accumulated added signal. The output of the delay component 212 is input to the adder 210 while the switch 214 is in the open state. The switch 214 maintains its open state for an observation time of a delay profile, and transitions to a closed state after a lapse of the observation time.

If the switch 214 is in the closed state, the output signal of the delay component 212 is input to the IFFT unit 216, in which the output signal of the delay component 212 undergoes an IFFT process and is converted into a time-domain signal. At this time, the same impulse response can be obtained as that created by the correlator 218 in the base station 200 shown in FIG. 1. This impulse response is input to the TDOA calculator 220. The TDOA calculator 220 detects receive timings of direct waves corresponding to respective antennas using the delay profile obtained from the impulse response being input for each antenna, and calculates their TDOA.

If the TDOA between antennas is calculated in this manner, it is possible to achieve position detection from the TDOA. While the TDOA calculator 220 in the base station 200 shown in FIG. 1 is a structure for achieving timing detection using the delay profile being input from the correlator 218, the TDOA calculator 220 shown in FIG. 6 is adapted to achieve timing detection by calculating a delay profile from the input impulse response.

As described above, a configuration of calculating an autocorrelation by multiplication on the frequency axis is proposed in the first modification associated with the embodiment. With use of this configuration, it is possible to obtain a delay profile similar to the configuration of calculating an autocorrelation on the time axis, and to reduce the circuit size.

Second Modification: Configuration Using MPIC

As described above, by applying the technology associated with the embodiment, it is possible to obtain a delay profile having sharp autocorrelation peaks. However, periodicity may appear in autocorrelation characteristics due to periodicity of the trigonometric function. This periodicity appears in the impulse response in the form of side lobes, and affects adjacent path components. Therefore, appropriate measures are needed when it is not possible to obtain a situation where the adjacent paths are not affected by the side lobes, or an environment where a sufficiently large bandwidth is available. Accordingly, a method for efficiently reducing the influence of the side lobes using a Multi-Path Interference Canceller (MPIC) is proposed as the second modification associated with the embodiment.

Influence of Side Lobes

First, an influence of side lobes will be described in detail with reference to FIGS. 11A to 11C. FIGS. 11A to 11C are provided to define characteristics of shapes occurring in an impulse response due to a difference between frequency allocation methods for a signal spectrum. FIG. 11A illustrates a signal spectrum and a waveform of an impulse response when chunks are consecutively placed in ascending order. FIG. 11B illustrates a signal spectrum and a waveform of an impulse response when chunks are placed at regular intervals. FIG. 11C illustrates a signal spectrum and a waveform of an impulse response when frequency hopping (chunk hopping) associated with the embodiment is applied.

In FIG. 11A, since multiple chunks are placed in a narrow band, narrowband communication is possible and a shape of the impulse response is blunt. In FIG. 11B, because multiple chunks are distributed over a relatively broad band at regular intervals, broadband communication corresponding thereto is possible and sharp peaks appear in the impulse response. However, when the chunks are placed at regular intervals, since periodicity exists, multiple sharp autocorrelation peaks appear in the impulse response. These autocorrelation peaks appearing in positions different from the positions of the original autocorrelation peaks are called side lobes. If a delay path exists in time positions of the side lobes, the amplitude level is offset or emphasized depending on the phase change in a transmission path.

Meanwhile, because an ideal autocorrelation waveform of one path where reverse modulation has been performed is symmetrical, if delayed waves are affected by the side lobes, even direct waves in the corresponding positions are affected by side lobes influencing the delayed waves. In FIG. 11C, because frequency hopping is used, it is possible to secure a relatively wide interval between placed chunks. By applying the configuration of the base station 200 using an MPIC described below, it is possible to efficiently reduce an influence of the side lobes. As a result, the number of positions of autocorrelation peaks appearing in the impulse response is almost one as shown in FIG. 11C, and it is possible to detect receive timings of direct waves at high precision.

Configuration of Base Station 200

Figure 7:
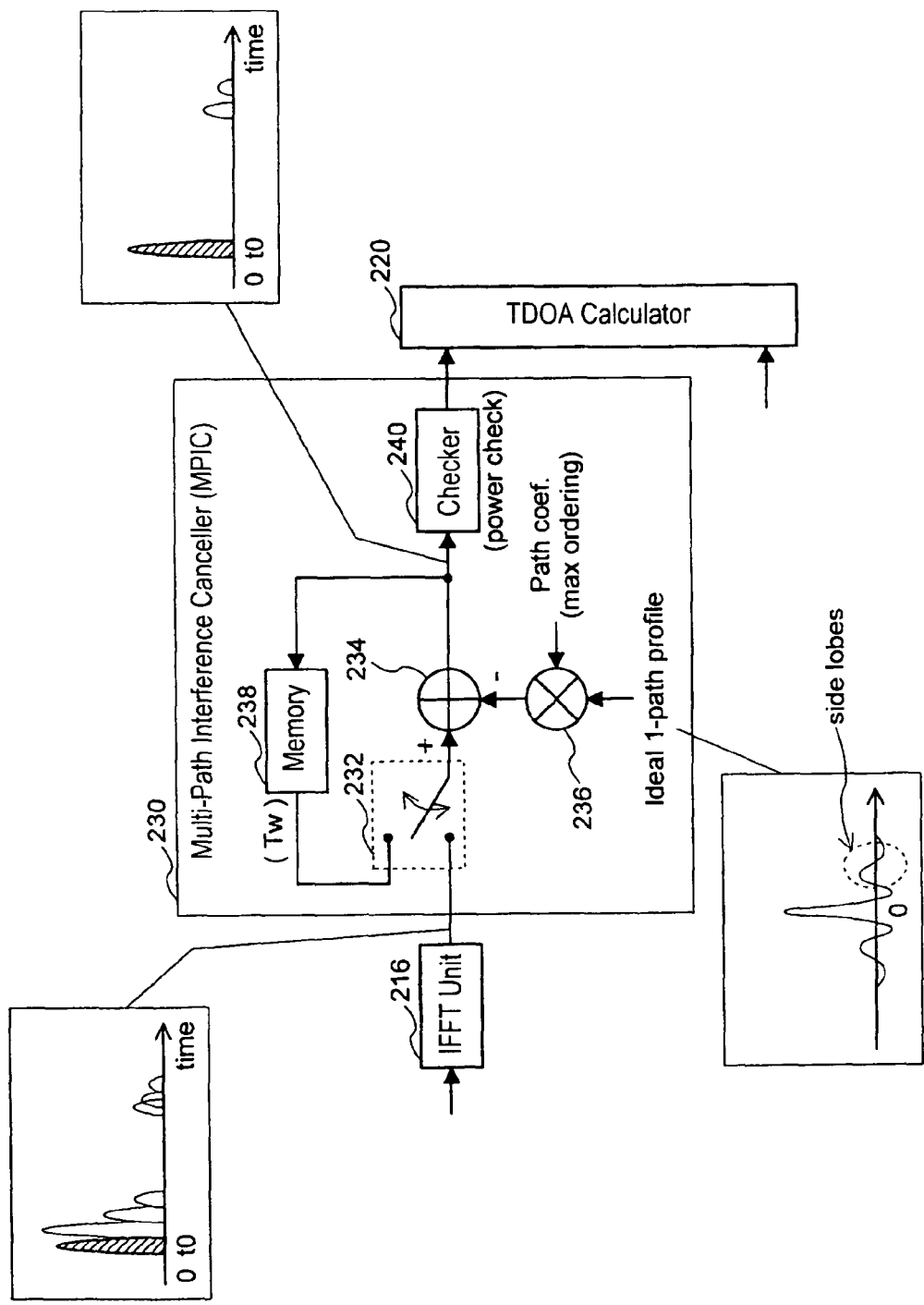
FIG. 7 illustrates a configuration of a base station according to a second modification of the embodiment.

Based on the above problems, the second modification proposes a configuration in which an MPIC 230 is inserted between the IFFT unit 216 and the TDOA calculator 220 in the base station 200 shown in FIG. 6, as shown in FIG. 7. As stated above, if there are multiple paths, side lobes of each path interfere with each other, generating multipath interferences. Therefore, direct waves may be obtained if delayed waves can all be cancelled by the MPIC 230.

As shown in FIG. 7, the MPIC 230 essentially includes a switch 232, a subtractor 234, a multiplier 236, a memory 238, and a checker 240. It is assumed that a delay profile (hereinafter, an ideal 1-path profile) during one-path reception is reserved in the MPIC 230, wherein the delay profile can be obtained by a pre-calculation method or by a calculation method of using transmission data that has been fed back after completion of the reception process. The ideal 1-path profile is a delay profile obtainable when a signal ideally received via one path is input.

When the IFFT unit 216 is connected to the subtractor 234 by the switch 232, a time-domain signal is input from the IFFT unit 216 to the subtractor 234. However, when the memory 238 is connected to the subtractor 234 by the switch 232, an output signal of the memory 238 is input to the subtractor 234. The subtractor 234 subtracts the output signal of the multiplier 236 from the signal input from the IFFT unit 216 or the memory 238. The multiplier 236 receives, as its inputs, an ideal 1-path profile of the MPIC 230, and an amplitude and phase fluctuation (or path coefficient) in the maximum path among multiple paths that have occurred in the transmission path. These input values are complex-multiplied by the multiplier 236, and then input to the subtractor 234.

In the subtractor 234, the output signal of the multiplier 236 is first subtracted from the received signal input from the IFFT unit 216. At this time, if cancellation of multipath components is valid, the total power is reduced. However, if a wrong path coefficient is given to the multiplier 236, the cancellation fails, and the total power is not reduced. Thus, the signal subtracted in the subtractor 234 is input to the checker 240. The checker 240 detects the total power of the signal subtracted in the subtractor 234, and determines whether or not the total power has been reduced. In the case of a reduction in the total power, the checker 240 stores the detected total power in the memory 238. As a memorable period of the memory 238, a time window Tw corresponding to the guard interval is required. If possible, a time window corresponding to a 1-OFDM symbol length Ts is preferable as the memorable period.

If a cancel operation for the multipath components is initiated, the switch 232 switches the subtractor 234 to the memory 238. The cancel operation performed on the received signal is repeated, so that cancellation of the multipath components is carried out by the subtractor 234 as many times as the number of detectable paths. In the repetition, the checker 240 detects an increasing reduction in the total power. If the checker 240 cannot check the reduction of the total power, the checker 240 detects a receive timing of a path having the shortest delay time among the detected paths, and inputs the detected receive timing to the TDOA calculator 220. When cancelable paths are all canceled out, a path with the shortest delay time among the detected paths corresponds to the direct wave.

As described above, by applying the method associated with the second modification of the embodiment, it is possible to remove the influence of side lobes and to detect receive timings of direct waves at higher precision. The structure of the MPIC 230 is a mere example, and may be replaced with an interference canceller capable of achieving the same purpose. For example, many modifications are possible, such as a parallel type MPIC, a cascade processing type MPIC, and a frequency-domain MPIC. Even with application of these modifications, it is possible to remove the influence of side lobes and detect accurate timings of direct waves, like in the multipath interference cancellation method mentioned as the second modification of the embodiment.

Third Modification: Configuration of Removing Influence Of Phase Fluctuation by In-phase Addition As described above, it is possible to enable broadband communication by using frequency hopping, and to detect receive timings of direct waves at high precision by removing the influence caused by multipath interference using an MPIC. However, when direct waves are attenuated due to frequency-selective fading, the direct waves may be offset in simple addition/averaging for received signals. Thus, research is needed that makes it possible to detect direct waves with quick addition/averaging.

Configuration of In-phase Averager 250

Figure 8:
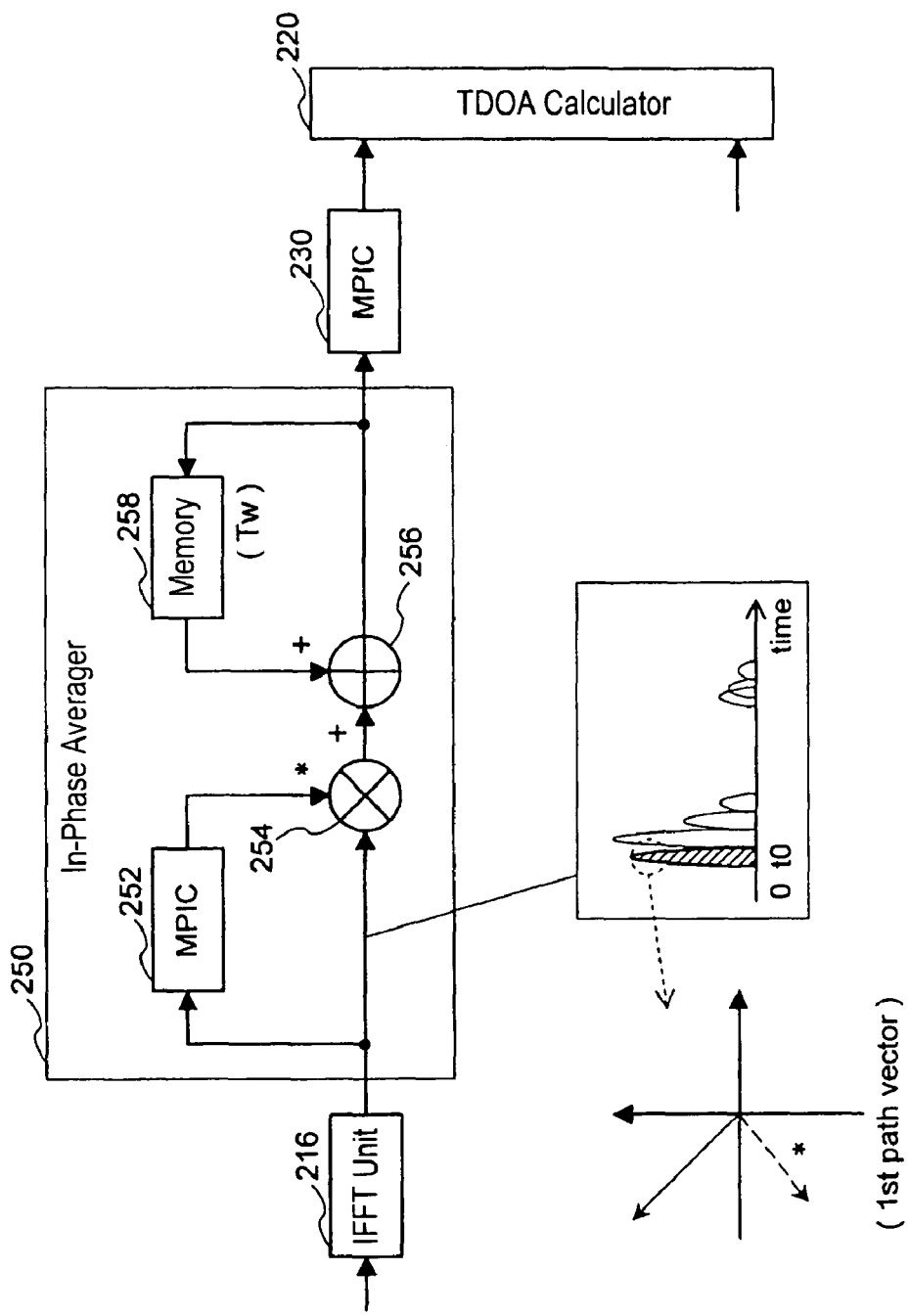
FIG. 8 illustrates a configuration of a base station according to a third modification of the embodiment.

Based on the above problems, the third modification proposes a configuration in which an in-phase averager 250 and an MPIC 230 are inserted between the IFFT unit 216 and the TDOA calculator 220 in the base station 200 shown in FIG. 6, as shown in FIG. 8. The in-phase average 250 is a characteristic component of the third modification. As such, only the in-phase averager 250 will be described in detail below.

In the in-phase averager 250, average processing on an impulse response is executed. Generally, power addition/averaging and in-phase addition/averaging may be considered for the average processing. The term "in-phase addition/averaging" refers to a process of performing addition/averaging on a phase-corrected signal. Because the in-phase addition/averaging, compared with even the simple power addition/averaging, increases in power level due to in-phase addition of signals, high average effect can be obtained. In order to perform the in-phase addition/averaging, it is necessary to calculate an in-phased vector. Thus, the third modification proposes how to use the detection results (described below) of temporary preceding waves determined using an MPIC.

As shown in FIG. 8, the in-phase averager 250 includes an MPIC 252, a multiplier 254, an adder 256, and a memory 258. The MPIC 252 is identical to the MPIC 230 shown in FIG. 7. Thus, a received signal that has been received from the IFFT unit 216 to the in-phase averager 250 is corrected to a signal (detection results on temporary preceding wave) from which multipath interference components are removed by the MPIC 252. An output signal (temporary preceding wave's signal vector) of the MPIC 252 is input to the multiplier 254, in which it undergoes conjugate complex multiplication for all samples included in a 1-OFDM symbol interval.

The phase of delayed waves is indeterminate, and even though conjugate complex multiplication is performed in the phase of preceding waves, the results of phase correction are not in-phase. Therefore, in multiplication processing by the multiplier 254, the phase of temporary preceding waves is always zero ('0') and the other delayed-wave components are randomized. An output signal of the multiplier 254 is input to the adder 256, to which an output of the memory 258 is also input. An output of the memory 258 is assumed to be zero ('0') at an initial state corresponding to the first addition/averaging. Therefore, the intact output of the multiplier 254 is output to the adder 256 at the initial state. That is, an impulse response that underwent in-phasing (in which a phase term is corrected to zero ('0')) is output. An output of the adder 256 is stored in the memory 258.

After a lapse of a certain time, if a received signal is input again from the IFFT unit 216 to the in-phase averager 250, the above process is performed on the input signal in the MPIC 252 and the multiplier 254. With the passage of time, frequency selectivity of the transmission path is changed, and phase and amplitude fluctuation occurs in each path in the impulse response. Thus, in the case of simple addition/averaging, subtraction by reverse phase is likely to occur between preceding waves. However, in the case of the third modification, in-phasing is performed on the preceding waves. Hence, in the adder 256, addition is performed on delayed waves at a random phase, and addition is performed on preceding waves so that an average level may rise.

In the above configuration, since a correction vector is given based on the temporary preceding waves, it is likely that an error will occur compared with the case of adopting the original preceding waves. However, since average processing is performed for a sufficient time, the error is also averaged. After completion of a predetermined number of in-phase average processing, the output signal of the adder 256 is input to the MPIC 230, in which multipath interference cancellation is performed on the impulse response, preceding waves of which were emphasized by the in-phase averaging. The impulse response that underwent the multipath interference cancellation is input to the TDOA calculator 220, in which receive timings of preceding waves are detected based on a delay profile obtainable from the impulse response. With this configuration, detection precision is further improved.

Path Detection Threshold

A path detection threshold is described. Consideration of this threshold is possible even in the second modification. Compared with delayed waves with a level unreduced, the preceding waves with a level significantly reduced by fading can be hardly distinguished from noises. So, a threshold is set in order to avoid misdetection. To distinguish the preceding waves from noise, path candidates having power being integer times the average noise power are not regarded as paths in step one ('1'). To prevent noise from being regarded as paths, paths less than or equal to 1/x of the maximum level (where x is a predetermined number) are not regarded as paths in step two ('2'). Misdetection may be reduced by setting the thresholds of steps one ('1') and two ('2').

As described above, by applying the technology associated with the third modification of the embodiment, it is possible to prevent preceding waves from being added in reverse phase by the influence of frequency-selective fading. As a result, it is possible to prevent the preceding waves from undergoing level degradation due to fading. The configuration of the in-phase averager 250 shown in FIG. 8 is a mere example, and various modifications are possible. The utility of the third modification lies in performing in-phase addition/averaging with a complex amplitude (phase) of the preceding waves, and detecting again the preceding waves based on the results. Thus, any configuration with this point may be arbitrarily modified.

Fourth Modification: Configuration of Switching Multiple Transmit Antennas

The method of performing in-phase addition/averaging in a receiving side as fading countermeasures was proposed in the third modification. However, the fourth modification associated with the embodiment proposes a method of achieving the fading countermeasures in a transmitting side. The concept of this method is shown in FIG. 9. As shown in FIG. 9, in the fourth modification, multiple antennas (e.g., 2 antennas) are installed in the wireless terminal 100 and these antennas are used for switching, for countermeasures for instantaneous level fluctuations caused by fading.

The level fluctuations by fading vary wavelength by wavelength. Hence, if physically separated antennas are used, a correlation between their levels is lower at a higher radio frequency in use. Accordingly, a method of using multiple transmit antennas and emitting radio waves alternately or simultaneously is effective. As shown in FIG. 9, in addition to the modulator 102, the IFFT unit 104, the CP adder 106 and transmitter 108, a switch 110 is installed in the wireless terminal 100. The switch 110 is a switching means for switching multiple antennas. As shown in FIG. 9, since signals are transmitted to the base station 200 via multiple wireless paths by the switching of the switch 110, the effect of transmit antenna selection diversity may also be obtained. By combination with the third modification, it is possible to detect accurate receive timings of direct waves by average processing for a shorter time.

Fifth Modification: Application of SC-FDMA

Figure 10:
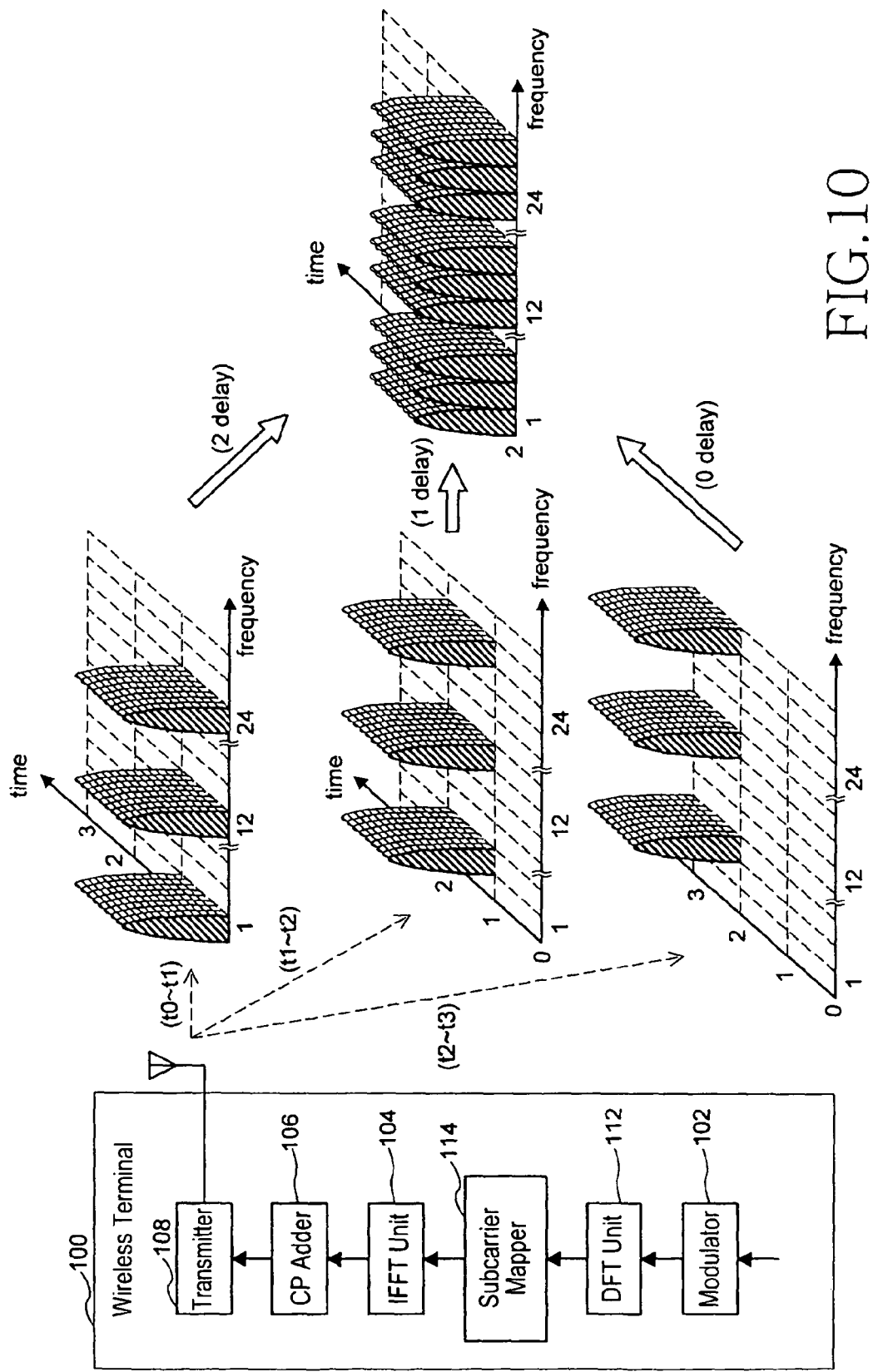
FIG. 10 illustrates a configuration of a wireless terminal according to a fifth modification of the embodiment.

So far, OFDM has been assumed as an example of the communication scheme. However, the technologies associated with the embodiment and its each modification can be applied regardless of single-carrier transmission and multi-carrier transmission. For example, as shown in FIG. 10, the technologies associated with the embodiment and its each modification can be applied to Single Carrier Frequency Division Multiple Access (SC-FDMA), which is a communication scheme in the uplink of 3GPP Long Term Evolution (LTE). This SC-FDMA scheme is also known as DFT-SPREAD OFDM.

When this communication scheme is applied, a Discrete Fourier Transform (DFT) unit 112 and a subcarrier mapper 114 are added in the wireless terminal 100 as components. The DFT unit 112 is a means for performing DFT on an input signal. The DFT unit 112 is installed to retain characteristics of a single carrier. The subcarrier mapper 114 is a means for mapping a subcarrier signal output from the DFT unit 112 to a predetermined frequency band. For example, it is preferable that chunks are placed at regular intervals as shown in FIG. 10. This function of the subcarrier mapper 114 is realized by the modulator 102 in the wireless terminal 100 shown in FIG. 1 or 9. The scheme of placing transmission spectrum at regular intervals is called a "distributed mode" in LTE.

When the technology of the embodiment is applied, the center frequency may undergo frequency hopping, with a placement rule of the distributed mode being maintained. Next, the effects that have been described so far can be obtained by using the intact technologies associated with the embodiment and its each modification. Even in a "localized mode" where spectrum is centralized in one point on the frequency axis, the intact technologies associated with the embodiment and its each modification may be applied by using the frequency hopping. By applying the technologies associated with the embodiment to the schemes prescribed by LTE, direct wave's timing detection at high precision is possible since the start of a fourth generation (4G) mobile communication service. As a result, it is possible to build a foundation that provides a high-precision position detection service.

Effects

The effects obtainable by each of the above configurations will be described below.

Effects by Basic Configurations (FIGS. 1 and 6) of Embodiment

Figure 12:
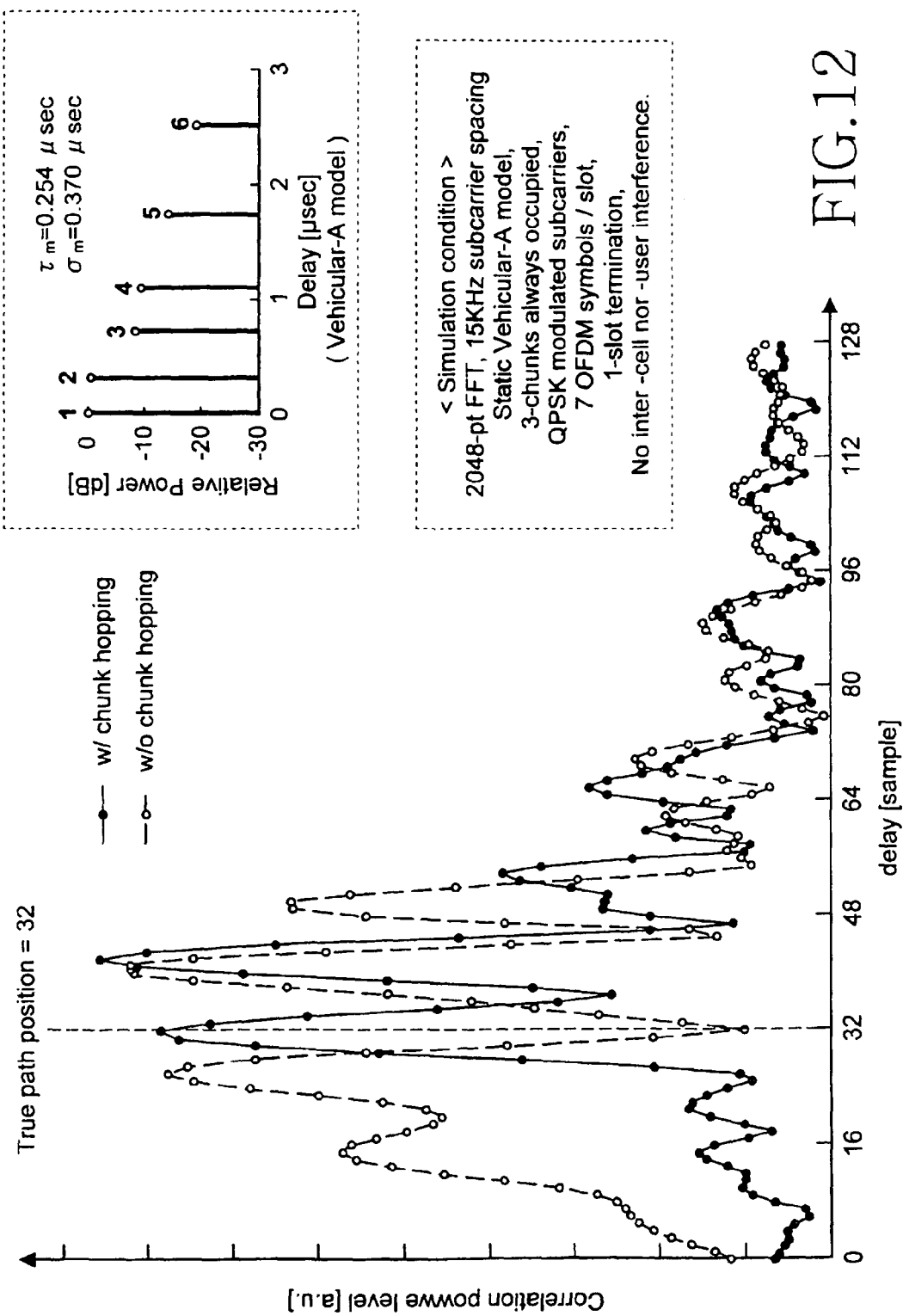
FIG. 12 illustrate the effects obtainable by the embodiment of the present invention.

First, calculator simulation results are illustrated in FIG. 12, for the basic configurations of the embodiment shown in FIGS. 1 and 6. FIG. 12 illustrates the simulation results obtainable by application of a model of a transmission path called Vehicular-A defined in 3rd Generation Partnership Project (3GPP). In this model, five delayed waves are assumed in addition to a direct wave. A delay time difference between a direct wave and a first delayed wave is approximately three hundred nanoseconds ('300 ns'). For simulation conditions, it is assumed that OFDM is used as a modulation scheme, and three ('3') chunks are always used, in which each chunk consisting of twelve ('12') subcarriers is one unit.

In a comparison example (without chunk hopping), it is assumed that three ('3') chunks are continuously allocated. Meanwhile, in the embodiment (with chunk hopping), it is assumed that seven ('7') OFDM symbols may be handled and a total of 3×7=21 chunks are used. It can be clearly understood from FIG. 12 that in the results of the embodiment, peaks appear in the original peak positions (thirty-two ('32') [samples]), and direct waves may be separated from delayed waves. In the comparison example, no autocorrelation peaks exist in the original peak positions, making it impossible to precisely detect receive timings of direct waves. By applying the basic configurations of the embodiment, it is possible to improve detection precision of direct waves without giving a burden to the transmitting side. As a result, high-precision position detection in cellular communication may also be achieved.

Effects by Configuration (FIG. 7) of Embodiment

As described above, in the second modification, by performing multipath interference cancellation, it is possible to reduce direct wave detection errors occurring due to incomplete autocorrelation characteristics having side lobes. The results obtained by verifying the effects by calculator simulation are illustrated in FIG. 13.

In this simulation, a Typical Urban model defined in 3GPP is used. This model is shorter than even the Vehicular-A model in terms of a time interval between a direct wave and a first delayed wave. That is, this model may be significantly affected by side lobes. In FIG. 13, a comparison is made between one case in which the MPIC is enabled and another case in which the MPIC is not enabled. The number of chunks in use is defined as a parameter, and a Mean Squared Error (MSE) is measured with their patterns.

Figure 13:
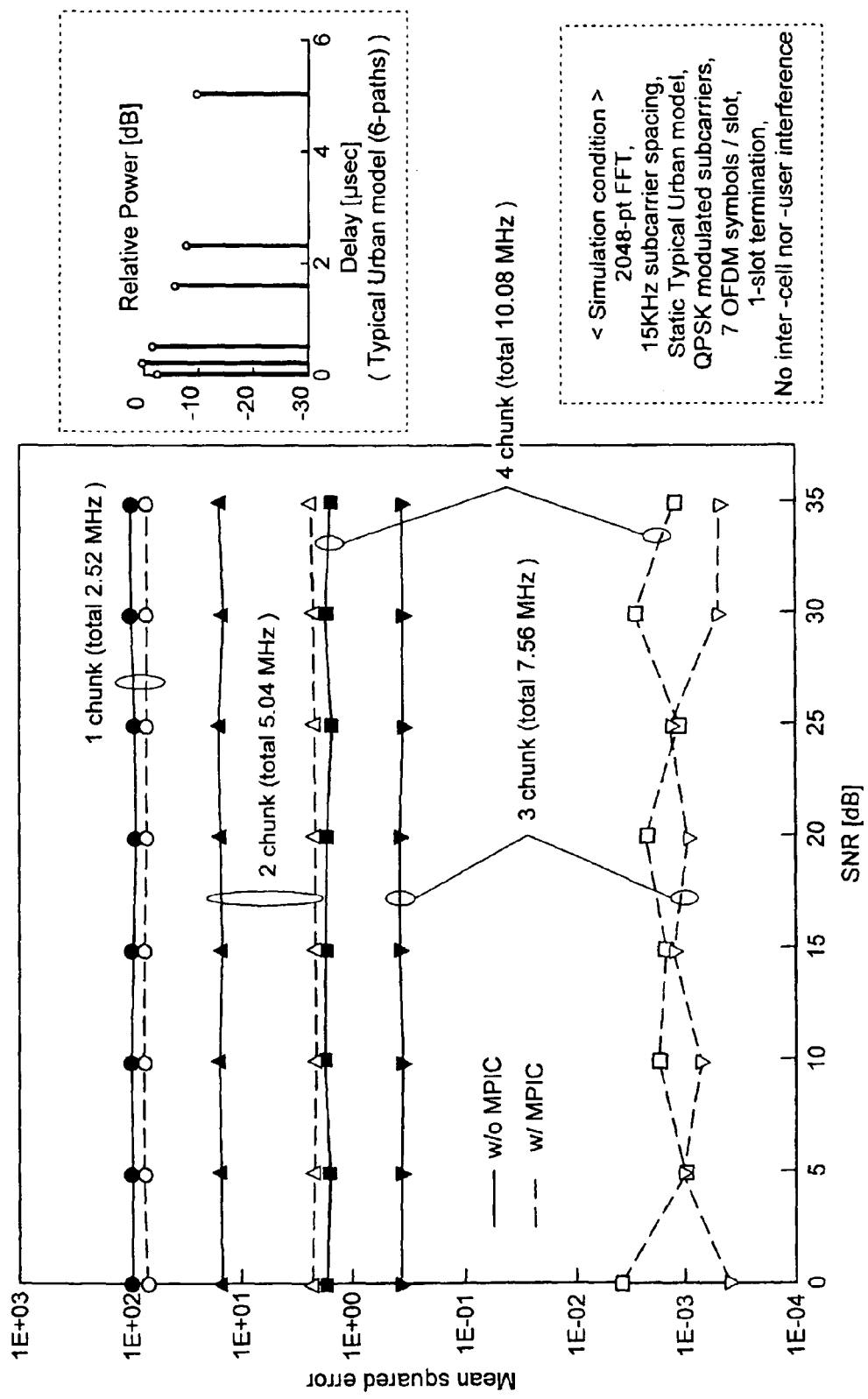
FIG. 13 illustrate the effects obtainable by the embodiment of the present invention.

Referring to FIG. 13, while MSE merely becomes approximately 0.5 on condition of using four ('4') chunks in the case where the MPIC is not used, MSE becomes about 0.001 on condition of using three ('3') chunks in the case in which the MPIC is applied. Simply considering these results, it is meant that one sample error occurs in five cases out of ten in the case in which the MPIC is not enabled, and one sample detection error occurs once every thousand ('1000') times in the case in which the MPIC is enabled. Namely, despite a simple opinion without considering error distribution, it is construed to achieve sufficient precision by the MPIC operation. From these results, with application of the MPIC, it is possible to reduce the used bandwidth from four-chunk usage to three-chunk usage, and also to improve detection precision. The exact timing detection is achieved even in conditions susceptible to side lobes of an autocorrelation.

Effects by Configuration (FIG. 8) of Third Modification

Figure 14:
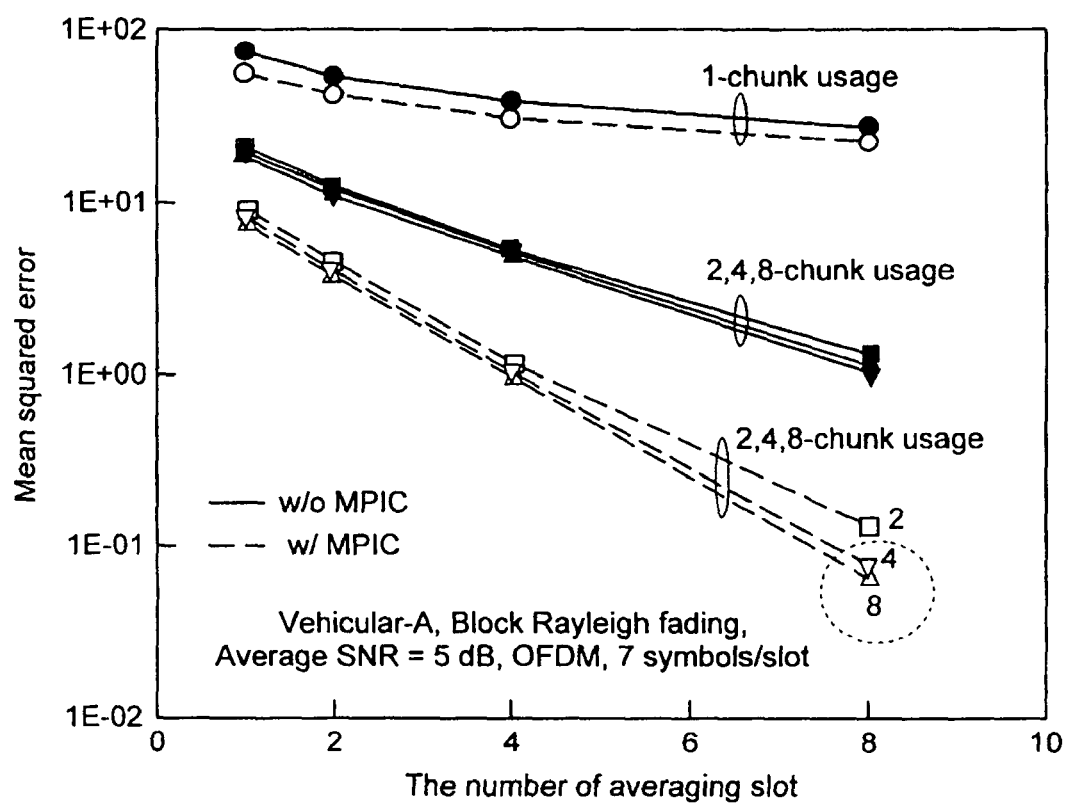
FIG. 14 illustrate the effects obtainable by the embodiment of the present invention.

Next, the calculator simulation results are illustrated in FIG. 14, for the effects by the configuration of the third modification. In FIG. 14, because the fading effect is added to the simulation conditions, it is set that fading changes on a slot (seven ('7') OFDM symbols) basis. It is apparent from FIG. 14 that MSE dramatically decreases along with an increase in the number of averaging slots. Paying attention to four-chunk usage, on the assumption that the MPIC is operating, if in-phase addition/averaging is performed eight ('8') times (see the right side), MSE is reduced to up to about 1/100, compared with when the in-phase addition/averaging is not performed (the average number of slots is one).

Comparing the presence and absence of the MPIC for the case where the in-phase addition/averaging is performed eight ('8') times on average, it is also noted that MSE decreases to about 1/10. The threshold for avoiding misrecognition of paths is set to twice the average noise power and to one-tenth of the maximum path level. These values are moderately changed depending on the system configuration in use. Therefore, by performing a more delicate adjustment, it is likely possible to obtain more improve the path timing detection precision. As described above, even though level degradation due to fading occurs, it is possible to suppress the errors with application of the configuration of the third modification.

As described above, the embodiment is characterized by a configuration in which the transmitting side performs frequency hopping and the receiving side performs accumulative addition on a received signal and determines a delay profile from the accumulated added signal. By these characteristic configurations, it is possible to calculate the delay profile just like when performing broadband communication, and to make an autocorrelation peak included in the delay profile sharp. As a result, it is possible to detect receive timings of direct waves from the delay profile at high precision. Despite application of the technologies associated with the embodiment, the transmit power is not increased.

In the second modification, the receiving side re-modulates the successfully decoded received signal, creates a replica of a transmission signal, and specifies direct waves by separating multiple paths while canceling multipath interference using the autocorrelation waveform. As a result, detection precision of direct waves incorrectly detected by side lobes of the autocorrelation function created due to the incomplete transmission signal is reduced. In the third modification, in-phase addition/advertising of the measured impulse response is conducted as measures for instantaneous fluctuations by fading. At this time, an in-phasing process is performed using a complex vector only for the leading path that has been temporarily detected as an in-phased vector. As a result, if continuous transmission time is not allocated to the transmitting side, the phase is changed by being affected by fading, and in the simple addition/averaging, a stable delay profile may not be detected even though the direct waves are canceled away.

In the fourth modification, a configuration of transmitting signals via multiple antennas installed in the transmitting side alternately or simultaneously is proposed as measures for instantaneous fluctuations by fading. With application of this configuration, it is possible to reduce a transmission time required for measurement to 1/x of the antennas (where x is a predetermined number). In addition, by combination with the third modification, it is possible to more efficiently remove the effects of fading. In the fourth modification, broadband sensing signals are realized considering a communication scheme having signal spectrum at regular intervals, which corresponds to the distributed mode of LTE. As a result, broadband sensing is allowed at the same time, facilitating stabilization of the delay profile.

Thus, high time resolution can be obtained by applying the technologies associated with the embodiment and its each modification, thereby realizing a cellular system that can suppress an measurement error of position detection within thirty meters ('30 m') without significantly changing the existing wireless terminals.

As is apparent from the foregoing description, according to an exemplary embodiment of the present invention, it is possible to detect receive timings of direct waves at higher precision without increasing transmit power of the wireless terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless communication device comprising:
   a signal receiver configured to receive a signal comprising a center frequency that is changed in a predetermined rule at intervals of a predetermined time;
   a time-frequency transformer configured to transform an output of the signal receiver to a frequency-domain signal;
   an unused-domain component removing filter configured to remove frequency-domain signal components unused during reception, based on the predetermined rule, from the frequency-domain signal;
   a signal adder configured to generate an added signal by performing accumulative addition on the remaining signal components that have passed through the unused-domain component removing filter for a predetermined period;
   a frequency-time transformer configured to transform the added signal from the frequency domain to the time domain; and
   a direct wave arrival time determiner configured to determine an arrival time of a direct wave according to an impulse response based on an output signal from the frequency-time transformer.

2. The wireless communication device of claim 1, further comprising a Multi-Path Interference Canceller (MPIC) configured to cancel multipath interference components included in the impulse response.

3. The wireless communication device of claim 2, further comprising an in-phase addition-averaging unit configured to perform in-phasing on a pertinent impulse response based on a phase of a direct wave temporarily detected by removing multipath interference components from the impulse response, and average the impulse response for a predetermined time.

4. The wireless communication device of claim 1, further comprising an in-phase addition-averaging unit configured to perform in-phasing on a pertinent impulse response based on a phase of a direct wave temporarily detected by removing multipath interference components from the impulse response, and average the impulse response for a predetermined time.

5. The wireless communication device of claim 1, wherein the predetermined time seriod comprises a virtual symbol interval the virtual symbol interval comprising a plurality of actual symbol intervals.

6. The wireless communication device of claim 1, further comprising a correlator configured to:
perform an autocorrelation operation to determine the impulse response; and
calculate a delay profile from the impulse response.

7. The wireless communication device of claim 1, further comprising:
a multiplier configured to multiply an added signal by one of a pilot signal and a multiplication coefficient based on a transmission data signal.

8. A method for detecting a timing of a direct wave in a wireless communication device, comprising:
receiving a signal having a center frequency that is changed in a predetermined rule at intervals of a predetermined time;
transforming the received signal to a frequency-domain signal;
removing frequency-domain signal components unused during reception based on the predetermined rule from the frequency-domain signal;
performing a reverse modulation process on remaining signal components left after the unused-frequency-domain signal components are removed from the frequency domain signal;
generating an added signal by performing accumulative addition on the reverse-modulated signal components for a predetermined period;
transforming the added signal from the frequency domain to the time domain; and
determining an arrival time of the direct wave based on an impulse response obtainable from the added signal in the time domain.

9. The method of claim 8, further comprising:
performing an autocorrelation operation to determine the impulse response; and
calculating a delay profile from the impulse response.

10. The method of claim 8, further comprising canceling multipath interference components included in the impulse response.

11. The method of claim 8, further comprising:
performing in-phasing on a pertinent impulse response based on a phase of a direct wave temporarily detected by removing multipath interference components from the impulse response, and average the impulse response for the predetermined time; and
canceling multipath interference components included in the impulse response.

12. The method of claim 8, wherein the predetermined time comprises a virtual symbol interval, the virtual symbol interval comprising a plurality of actual symbol intervals.

13. The method of claim 8, further comprising:
multiplying the added signal by one of a pilot signal and a multiplication coefficient based on a transmission data signal.

14. A wireless communication system comprising:
a plurality of base stations configured to communicate with a plurality of wireless terminals, each base station comprising:
a signal receiver configured to receive a signal comprising a center frequency that is changed in a predetermined rule at intervals of a predetermined time;
a time-frequency transformer configured to transform an output of the signal receiver to a frequency-domain signal;
a filter configured to remove frequency-domain signal components unused during reception, based on the predetermined rule, from the frequency-domain signal;
a signal adder configured to generate an added signal by performing accumulative addition on the remaining signal components that have passed through the unused-domain component removing filter for a predetermined period;
a frequency-time transformer configured to transform the added signal from the frequency domain to the time domain; and
a direct wave arrival time calculator configured to determine an arrival time of a direct wave according to an impulse response based on an output signal from the frequency-time transformer.

15. The wireless communication system of claim 14, wherein each base station further comprises a Multi-Path Interference Canceller (MPIC) configured to cancel multipath interference components included in the impulse response.

16. The wireless communication device of claim 15, further comprising an in-phase addition-averaging unit configured to perform in-phasing on a pertinent impulse response based on a phase of a direct wave temporarily detected by removing multipath interference components from the impulse response, and average the impulse response for a predetermined time.

17. The wireless communication system of claim 14, wherein each base station further comprises an in-phase addition-averaging unit configured to perform in-phasing on a pertinent impulse response based on a phase of a direct wave temporarily detected by removing multipath interference components from the impulse response, and average the impulse response for a predetermined time.

18. The wireless communication system of claim 14, wherein the predetermined time period comprises a virtual symbol interval, the virtual symbol interval comprising a plurality of actual symbol intervals.

19. The wireless communication system of claim 14, wherein each base station further comprises a correlator configured to:
perform an autocorrelation operation to determine the impulse response; and
calculate a delay profile from the impulse response.

20. The wireless communication system of claim 14, wherein each base station further comprises:
a multiplier configured to multiply an added signal by one of a pilot signal and a multiplication coefficient based on a transmission data signal.

* * * * *